(12) United States Patent
Obara et al.

(10) Patent No.: US 11,756,504 B2
(45) Date of Patent: Sep. 12, 2023

(54) VIDEO PROCESSING DEVICE AND DISPLAY DEVICE

(71) Applicant: LAPIS Technology Co., Ltd., Yokohama (JP)

(72) Inventors: Takuto Obara, Yokohama (JP); Yuki Imatoh, Yokohama (JP); Takuya Motohashi, Yokohama (JP)

(73) Assignee: LAPIS TECHNOLOGY CO., LTD., Yokohama (JP)

( * ) Notice: Subject to any disclaimer, the term of this patent is extended or adjusted under 35 U.S.C. 154(b) by 0 days.

(21) Appl. No.: 17/696,634

(22) Filed: Mar. 16, 2022

(65) Prior Publication Data
US 2022/0319464 A1 Oct. 6, 2022

(30) Foreign Application Priority Data
Mar. 30, 2021 (JP) ................................. 2021-056619

(51) Int. Cl.
*G09G 5/00* (2006.01)
*H04N 5/235* (2006.01)
*B60K 35/00* (2006.01)
*B60K 37/02* (2006.01)

(52) U.S. Cl.
CPC ............ *G09G 5/006* (2013.01); *B60K 35/00* (2013.01); *B60K 37/02* (2013.01); *B60K 2370/186* (2019.05); *B60K 2370/334* (2019.05); *B60K 2370/95* (2019.05); *G09G 2330/12* (2013.01); *G09G 2380/10* (2013.01)

(58) Field of Classification Search
CPC .................................................. G06T 7/0012
See application file for complete search history.

(56) References Cited

U.S. PATENT DOCUMENTS

2008/0297436 A1* 12/2008 Oikawa ................. G09G 5/006
345/8
2015/0245019 A1* 8/2015 Engelbrecht ......... H04N 17/002
348/175

FOREIGN PATENT DOCUMENTS

JP 6658391 B2 3/2020

* cited by examiner

*Primary Examiner* — Nan-Ying Yang
(74) *Attorney, Agent, or Firm* — Rabin & Berdo, P.C.

(57) ABSTRACT

A video processing device includes a receiver that successively receives input images, each having a prescribed overlapping image superimposed in one or more areas thereof, a compositing image generation unit that successively generates compositing images based on the external information, a video compositing unit that successively generates composite images, a compositing abnormality detection unit that determines whether one or more areas of the composite image have abnormality or not, a comparison unit that compares the one or more areas of the input image with those of the composite image to determine whether or not the respective areas match, if it is determined that the composite image have no abnormalities, and an output control unit that outputs the input image if it is determined that the respective areas match, and outputs the composite image when it is determined that the respective areas do not match.

7 Claims, 5 Drawing Sheets

VIDEO PROCESSING DEVICE AND DISPLAY DEVICE

CROSS REFERENCE TO RELATED APPLICATION

This application is based upon and claims the benefit of priority of the prior Japanese Patent Application No. 2021-056619, filed on Mar. 30, 2021, the entire contents of which are incorporated herein by reference.

TECHNICAL FIELD

The present invention relates to a video processing device and a display device.

BACKGROUND ART

In recent years, in order to improve visibility of various meters such as a speedometer and a tachometer while driving, the types of information shown in such meters are shown on a display of an in-vehicle display device constituted of a liquid crystal panel or the like. In addition to the display of those meters, warning lights such as a hydraulic pressure warning light are also displayed using the OSD (on-screen display) function.

For this type of in-vehicle display device, an in-vehicle video display system is proposed in which, among a plurality of display devices, an image from a display device determined to have a fault is replaced by a video from a display device determined to be normal so that necessary information can be displayed even when part of the display device breaks down (Patent Document 1 U.S. Pat. No. 6,658,391, for example).

SUMMARY OF THE INVENTION

Problems to be Solved by the Invention

The display of warning lights using the OSD function described above (referred to as a warning display below) pertains to the safety of drivers, and thus, it is necessary to display a correct image all the time. However, if abnormality such as a defect occurs in an image generation unit that generates an input image, then it would not be possible to display an image that shows a correct warning display. To solve this problem, a configuration is adopted in which an OSD image to replace a warning display in an input image is generated inside the display device, and if the image generation unit has abnormality, the OSD image generated internally is combined with the input image and displayed.

However, there may be a case where the composite image itself is defective, and as a result, wrong information could be displayed. This poses a problem of not being able to alert the driver for important signs such as a warning display.

The present invention was made in view of this problem, and an object of the invention is to provide a video processing device that can display an appropriate video by detecting abnormality regarding important information included in an input image.

Means for Solving the Problems

A video processing device according to the present invention includes: a receiver that successively receives, as input images, images successively generated, each input image of the input images having a prescribed superimposing image superimposed selectively in one or more areas of the input image based on external information; a compositing image generation unit that successively generates compositing images to be combined with the one or more areas of the input image based on the external information; a video compositing unit that successively generates composite images in which a compositing image is combined with the input image by replacing the one or more areas of the input image with the compositing image; a compositing abnormality detection unit that determines whether the one or more areas of the composite image have abnormality or not; a comparison unit that compares the one or more areas of the input image with the one or more areas of the composite image to determine whether or not respective areas match, if it is determined that the one or more areas of the composite image do not have abnormality; and an output control unit that outputs the input image if it is determined that the one or more areas of the input image and the one or more areas of the composite image match, and outputs the composite image when it is determined that the respective areas do not match.

A display device according to the present invention includes: a video generation unit that generates input images successively, the input images indicating a state that changes over time, and selectively superimposing a superposition image on one or more areas of each input image of the input images successively generated based on external information; a receiver that successively receives the input images; a compositing image generation unit that successively generates compositing images to be combined with the one or more areas of the input image based on the external information; an image compositing unit that successively generates composite images in which a compositing image is combined with the input image by replacing the one or more areas of the input image with the compositing image; a compositing abnormality detection unit that determines whether the one or more areas of the composite image have abnormality or not; a comparison unit that compares the one or more areas of the input image with the one or more areas of the composite image to determine whether the respective areas match or not, if it is determined that the one or more areas of the composite image do not have abnormality; an output control unit that outputs the input image if it is determined that the one or more areas of the input image and the one or more areas of the composite image match, and outputs the composite image when it is determined that the respective areas do not match; and a display unit that displays the input image or the composite image outputted from the output control unit.

According to the video processing device of the present invention, it is possible to display an appropriate video by detecting abnormality regarding important information included in an input image.

DETAILED DESCRIPTION OF EMBODIMENTS

Figure 1:
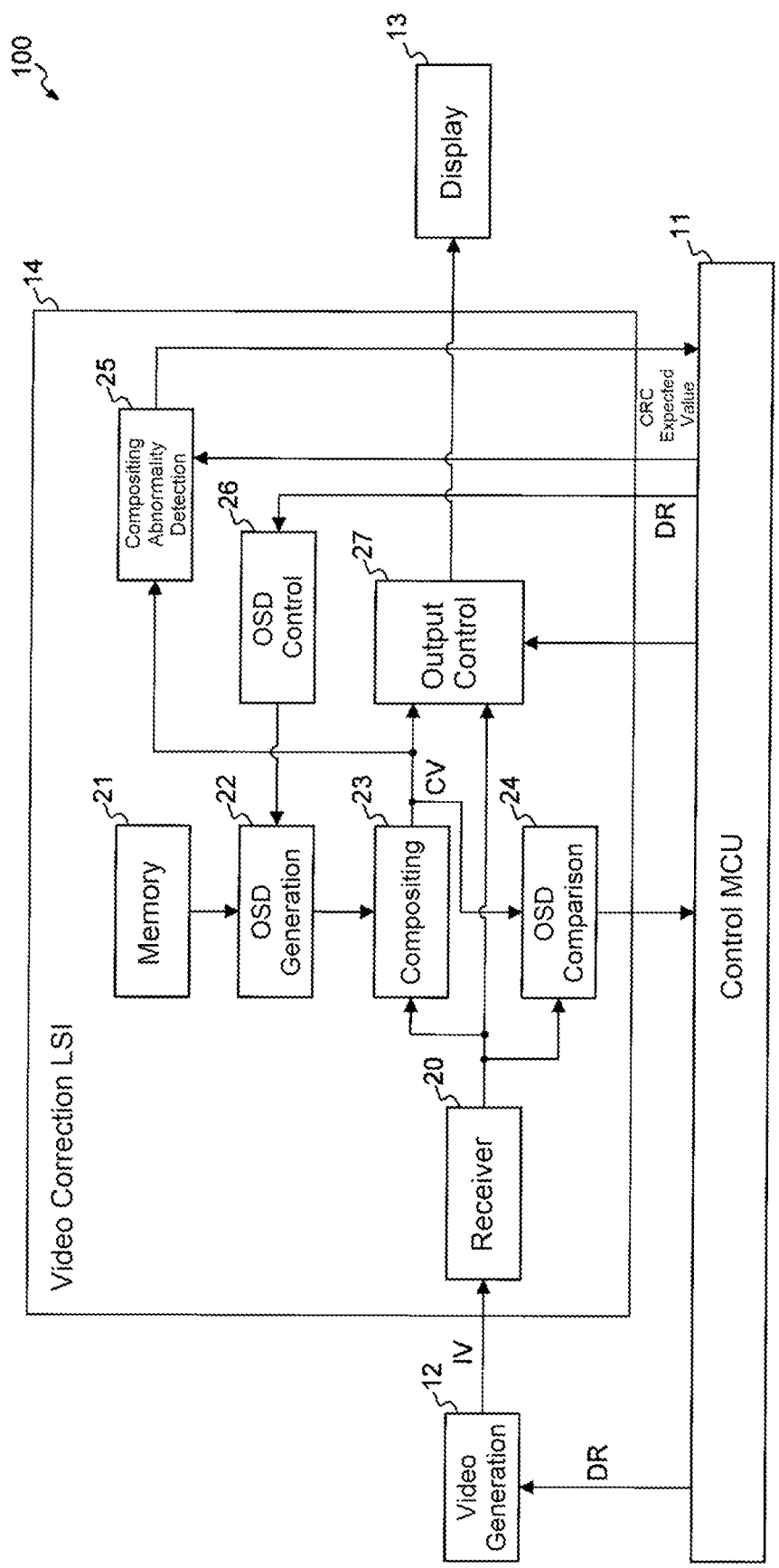
FIG. 1 is a block diagram illustrating a configuration of a display device including a video processing device of Embodiment 1 of the present invention.

Preferred embodiments of the present invention will be described in detail below. In the descriptions of respective embodiments below and appended diagrams, the same reference characters are given to parts that are substantially the same as each other or equivalent to each other.

Embodiment 1

FIG. 1 is a block diagram illustrating a configuration of a display device 100 of Embodiment 1. The display device 100 is an in-vehicle display device installed in a vehicle such as an automobile, for example, and displays a video representing a speedometer, fuel gage, and the like of the vehicle (referred to as a meter video below). In addition, the display device 100 combines this video with an image representing a warning light such as a hydraulic pressure warning light (referred to as a warning display below), using the OSD (on-screen display) function, and displays the composite video.

The display device 100 includes a control MCU 11, a video generation unit 12, a display 13, and a video correction LSI 14.

The control MCU (memory control unit) 11 is a process control unit that controls operations of the respective units in the display device 100. The control MCU 11 detects a vehicle equipped with the display device 100 being in a state where a warning light needs to be displayed (such as when the hydraulic pressure of the engine oil is low) based on information acquired from various sensors (not shown) in the vehicle, and supplies a display request signal DR requesting a display of a video including the warning display to the video generation unit 12 and the video correction LSI 14. The display request signal DR includes information indicating which warning light, among a plurality of warning lights, needs to be displayed as the warning display.

The control MCU 11 supplies a CRC (cyclic redundancy check) expected value for the warning display image to the video correction LSI 14 so that the video correction LSI 14 can determine whether the composite video CV generated by the video correction LSI 14 has abnormality or not.

The video generation unit 12 successively generates images representing the state of a speedometer, fuel gage, and the like that changes overtime. A meter video is constituted of those successively generated images continuing for multiple frames.

The video generation unit 12 also generates a warning display image based on the display request signal DR, which is information supplied from the control MCU 11 located outside the video correction LSI 14. The warning display image is a superimposing image (referred to as an OSD image) to be superimposed on the meter video by the OSD function. The video generation unit 12 generates an input video IV by superimposing the warning display image on the meter video successively and selectively. The warning display image is superimposed on a prescribed area of the meter video. In the descriptions below, the area where the warning display image is superimposed in the input video IV will be referred to as an OSD area.

The video generation unit 12 generates the input video IV in which the warning display image is superimposed on the meter video when the display request signal DR is supplied from the control MCU 11. If the display request signal DR is not supplied from the control MCU, then the video generation unit 12 generates the input video IV with the meter video only, not including the warning display image. The video generation unit 12 supplies the generated input video IV to the video correction LSI 14.

The display 13 is constituted of a liquid crystal display panel, for example. The display 13 displays the input video IV or the composite video CV on the screen in accordance with the control of the video correction LSI 14. Also, if abnormality is found in the composite video CV by the video correction LSI 14, the display 13 displays a message indicating the composite video CV has abnormality on the screen in accordance with the control of the control MCU 11.

The video correction LSI (large scale integration) 14 is a video processing device that receives an input of the input video IV, and generates and outputs a video to be displayed on the display 13 based on the input video IV. The video correction LSI 14 is constituted of a receiver 20, a memory 21, an OSD generation unit 22, a compositing unit 23, an OSD comparison unit 24, a compositing abnormality detection unit 25, an OSD control unit 26, and an output control unit 27. The respective units are formed in one-chip LSI.

The receiver 20 receives the input video IV outputted from the video generation unit 12. As described above, the input video IV is constituted of a plurality of consecutive images continuing for a plurality of frames, and the receiver 20 receives those images successively.

The memory 21 is a storage unit constituted of a nonvolatile semiconductor memory, and may be an internal memory installed in the video correction LSI, for example, or an external memory such as a flash memory that can be attached to the video correction LSI. The memory 21 stores therein image data used by the OSD generation unit 22 to generate OSD images for warning display.

The OSD generation unit 22 generates an OSD image showing a warning display as a compositing image, which is used by the compositing unit 23 to generate the composite video CV based on the image data loaded from the memory 21. The OSD image generated by the OSD generation unit 22 is generated by the OSD generation unit 22 independently of the video generation unit 12, and includes the same warning display as the warning display generated by the video generation unit 12.

The compositing unit 23 combines the OSD image generated by the OSD generation unit 22 with the input video IV, thereby generating the composite video CV. More specifically, the compositing unit 23 generates the composite video CV by replacing an image in the OSD area of the input video IV with the OSD image generated by the OSD generation unit 22.

The OSD comparison unit 24 compares the image of the OSD area of the input video IV with the image of the OSD area of the composite video CV, and determines whether the two images match each other. The OSD comparison unit 24 determines whether the two images match in all pixels in the OSD area or not. In this embodiment, if the match rate is 99% or higher, then that state is described as "all pixels are matching", and if the match rate is less than 99%, then that state is described as "not all pixels are matching". This match rate value is merely an example, and may appropriately be modified.

The compositing abnormality detection unit 25 detects abnormality in the composite video CV generated by the compositing unit 23. Specifically, the compositing abnormality detection unit 25 calculates a CRC value for the OSD area of the composite video CV, and by comparing the CRC value with the CRC expected value supplied from the control MCU 11, detects abnormality in the OSD area of the composite video CV.

The OSD control unit 26 controls the OSD generation unit 22 based on the display request signal DR from the control MCU 11 to generate the OSD image. For example, the OSD control unit 26 controls the OSD generation unit 22 based on information in the display request signal DR regarding the warning display (information indicating which warning light among a plurality of warning lights is to be displayed), such that the OSD generation unit 22 generates an image of a corresponding warning display.

The output control unit 27 outputs, in accordance with the control of the control MCU 11, the input video IV supplied from the video generation unit 12 or the composite video CV generated by the compositing unit 23 to the display 13 as an output video.

The display device 100 of this embodiment performs the "compositing abnormality detection process" to detect abnormality in the composite video CV including the OSD image generated inside the video correction LSI, and the "input video abnormality detection process" to detect abnormality in the input video IV by comparing the input video IV with the composite video CV. Below, the operations of those processes will be explained.

Figure 2:
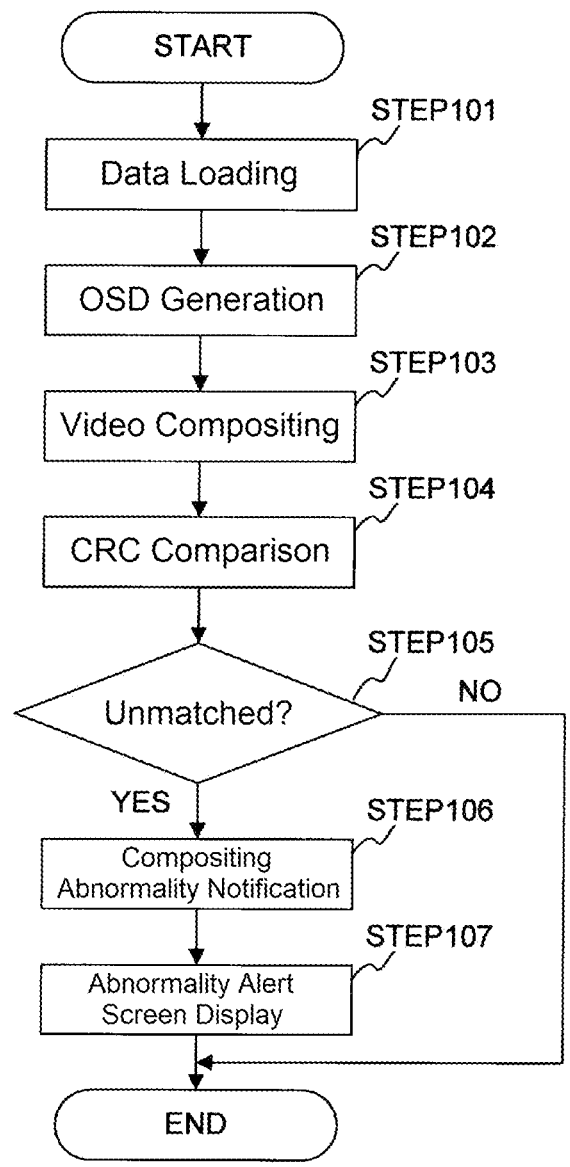
FIG. 2 is a flowchart illustrating a process routine of a compositing abnormality detection process performed by the video processing device of Embodiment 1 of the present invention.

First, the operation of the compositing abnormality detection process will be explained with reference to the flowchart of FIG. 2. The compositing abnormality detection process of this embodiment is performed in accordance with the display request signal DR sent from the control MCU 11 to the OSD control unit 26.

The OSD generation unit 22 loads the image data from the memory 21 (STEP 101).

The OSD generation unit 22 generates an OSD image using the loaded image data (STEP 102).

The compositing unit 23 generates the composite video CV by combining the OSD image generated by the OSD generation unit 22 with the input video IV supplied from the video generation unit 12 (STEP 103).

The compositing abnormality detection unit 25 calculates a CRC value for the OSD area of the composite video CV, and compares the calculated CRC value with the CRC expected value supplied from the control MCU (STEP 104).

The compositing abnormality detection unit 25 performs this comparison for every video frame to determine whether the calculated CRC value and the CRC expected value match or not, or in other words, whether the composite video CV has abnormality or not (STEP 105).

When it is determined that the calculated CRC value and the CRC expected value do not match (STEP 105: YES), the compositing abnormality detection unit 25 transmits to the control MCU an abnormality detection notification signal indicating that the composite video CV has abnormality (STEP 106).

Upon receiving the abnormality detection notification signal from the compositing abnormality detection unit 25, the control MCU 11 supplies to the output control unit 27 a request signal that requests a display of a message that indicates the composite video CV has abnormality. The output control unit 27 controls the display 13 to display the message indicating that the composite video CV has abnormality (STEP 107).

On the other hand, if it is determined that the CRC value and the CRC expected value do match in STEP 105 (STEP 105: NO), then the process is ended as there is no abnormality in the composite video CV.

As described above, in the display device 100 of this embodiment, the OSD generation unit 22 included in the video correction LSI 14 generates an OSD image, and the compositing abnormality detection unit 25 determines whether the composite video CV including that OSD image (more specifically, the OSD area of the composite video CV) has abnormality or not using the CRC value. This ensures that the OSD image generated in the video correction LSI 14 has no abnormality.

Figure 3:
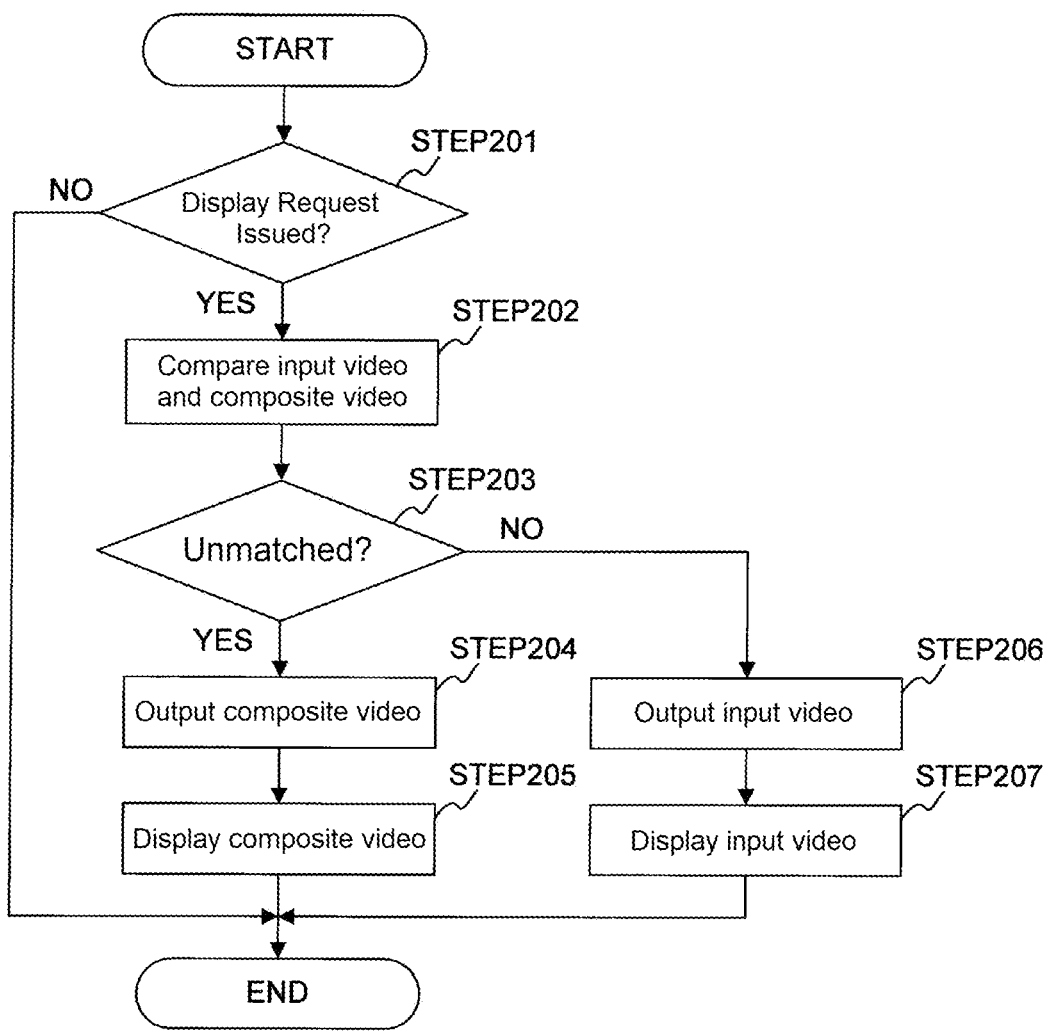
FIG. 3 is a flowchart illustrating a process routine of an input image abnormality detection process performed by the video processing device of Embodiment 1 of the present invention.

Next, the operation of the input video image abnormality detection process will be explained with reference to the flowchart of FIG. 3.

The video generation unit 12 determines whether or not the display request signal DR requesting the input video IV that contains a warning video has been supplied from the control MCU 11 (STEP 201).

When it is determined that the display request signal DR has not been supplied (STEP 201: NO), the video generation unit 12 generates and outputs the input video IV that does not contain a warning display (that is, the input video IV with a meter video only, not including the OSD image for a warning display).

On the other hand, if it is determined that the display request signal DR has been supplied (STEP 201: YES), then the OSD comparison unit 24 compares the input video IV having a warning video supplied from the video generation unit 12 with the composite video CV generated by the compositing unit 23 using the OSD image generated by the OSD generation unit 22 (STEP 202).

The OSD comparison unit 24 performs comparison on all pixels of the input video IV and the composite video CV, and determines whether or not there are unmatched pixels (STEP 203). The OSD comparison unit 24 supplies the determination result to the control MCU 11.

When receiving the determination result indicating that there are unmatched pixels from the OSD comparison unit 24 (STEP 203: YES), the control MCU 11 determines that the input video IV has abnormality, and controls the output control unit 27 to output the composite video CV to the display 13 (STEP 204).

The display 13 displays on the screen the composite video CV that contains the OSD image generated in the video correction LSI 14 (STEP 205).

On the other hand, if the determination result indicating there are no unmatched pixels (that is, all pixels are matching) is received from the OSD comparison unit 24 (STEP 203: NO), the control MCU 11 determines that the input video IV is normal, and controls the output control unit 27 to output the input video IV to the display 13 (STEP 206).

The display 13 displays the input video IV that contains the OSD image generated in the video generating unit 12 (STEP 207).

As described above, in the display device 100 of this embodiment, the input video IV supplied from the video generation unit 12 is compared with the composite video CV that contains the OSD image generated in the video correction LSI 14. Because the compositing abnormality detection process ensures that the composite video CV has no abnormality as described above, if the input video IV and the composite video CV match, then it is determined that the input video IV has no abnormality, and the input video IV is displayed in the display 13 as is. On the other hand, if the input video IV does not match the composite video CV, then it is determined that the input video IV has abnormality, and the composite video CV, instead of the input video IV, is displayed in the display 13.

According to the display device 100 of this embodiment, it is possible to detect abnormality in the input video resulting from a fault of the video generation unit and the like, and when abnormality is found in the input video, an appropriate video can be displayed instead of the input video.

Embodiment 2

Figure 4:
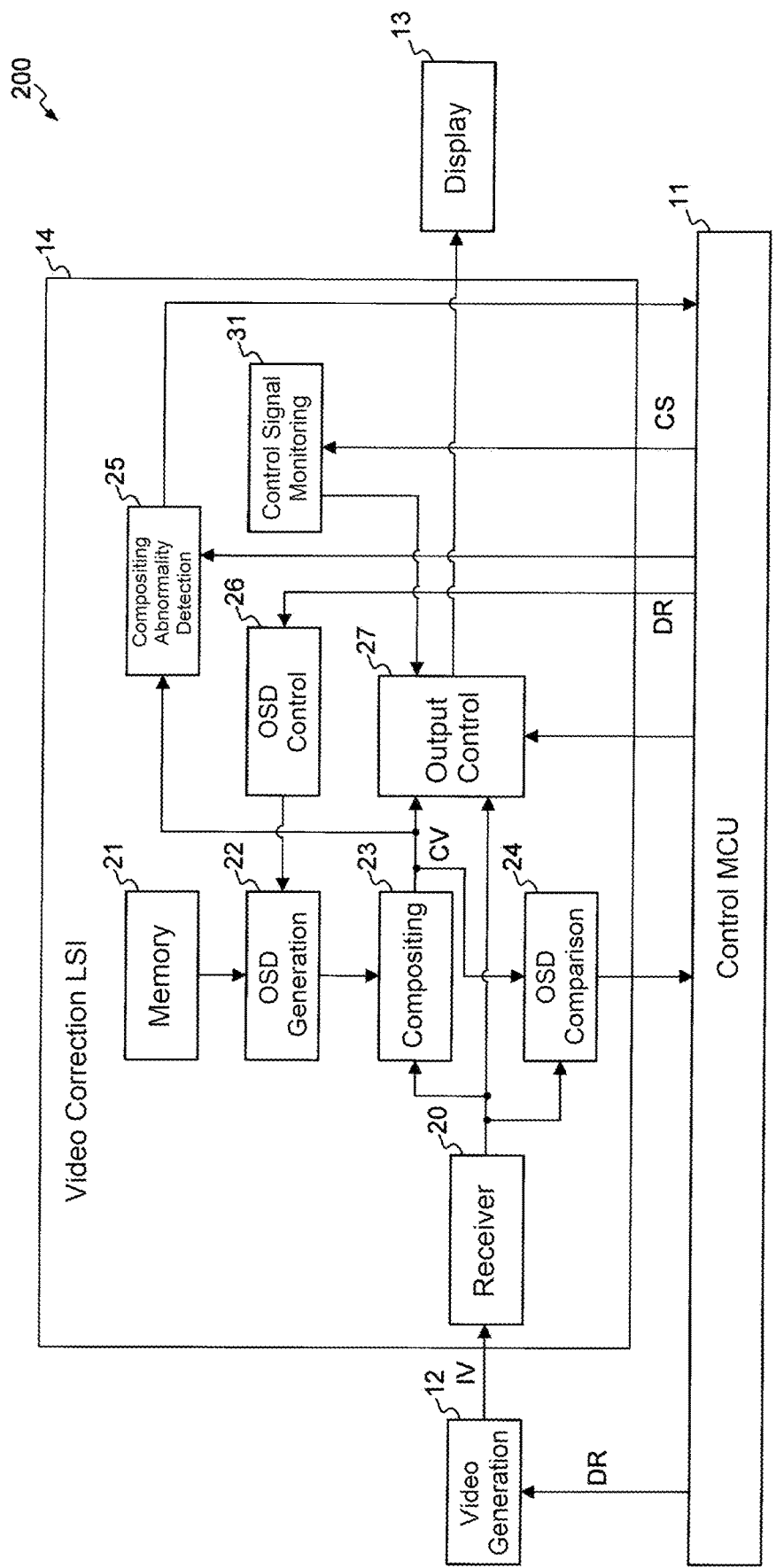
FIG. 4 is a block diagram illustrating a configuration of a display device including a video processing device of Embodiment 2 of the present invention.

Next, Embodiment 2 of the present invention will be explained. FIG. 4 is a block diagram illustrating the configuration of a display device 200 of Embodiment 1. The display device 200 differs from the display device 100 of Embodiment 1 in that the video correction LSI 14 also includes a control signal monitoring unit 31 that monitors signals from the control MCU 11.

The control MCU 11 of this embodiment supplies a control signal CS to the video correction LSI 14 at prescribed time intervals. This control signal CS differs from the display request signal DR, and is supplied regularly to the video correction LSI 114 whether or not a warning display is needed.

The control signal monitoring unit 31 monitors the control signal CS sent from the control MCU 11, and controls the output control unit 27 based on the monitoring results. Specifically, after receiving the control signal CS from the control MCU 11, the control signal monitoring unit 31 determines whether or not another control signal CS is received within a certain time period. If it is determined that another control signal CS is not received within a certain period of time, then the control signal monitoring unit 31 supplies to the output control unit 27 a request signal that requests a display of a message indicating that the control MCU 11 has abnormality. The output control unit 27 controls the display 13 to display the message indicating that the control MCU 11 has abnormality.

Figure 5:
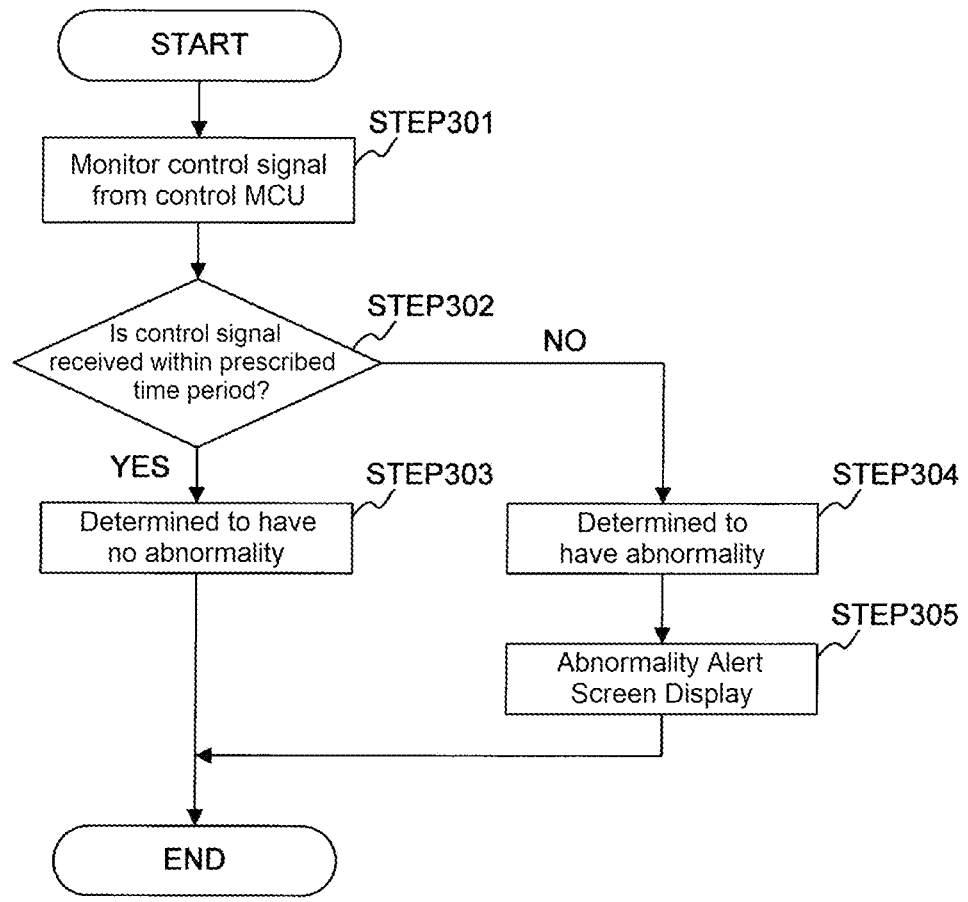
FIG. 5 is a flowchart illustrating a process routine of a control signal monitoring process performed by the video processing device of Embodiment 2 of the present invention.

The operation of the control signal monitoring process performed by the display device 200 of this embodiment will be explained with reference to the flowchart of FIG. 5.

The control signal monitoring unit 31 of the video correction LSI 14 monitors the control signal CS from the control MCU 11 (STEP 301).

The control signal monitoring unit 31 determines whether or not another control signal CS was received within a certain time period after the previous control signal CS was received (STEP 302).

If it is determined that another control signal CS was received within a prescribed period of time (STEP 302: YES), then the control signal monitoring unit 31 determines that the control MCU 11 has no abnormality (STEP 303), and ends the process.

On the other hand, if it is determined that another control signal CS was not received within a prescribed period of time (STEP 302: NO), then the control signal monitoring unit 31 determines that the control MCU 11 has abnormality (STEP 304).

The control signal monitoring unit 31 supplies to the output control unit 27 a request signal that requests a display of a message indicating that the control MCU 11 has abnormality. The output control unit 27 controls the display 13 to display the message indicating that the control MCU 11 has abnormality (STEP 305).

As described above, in the display device 200 of this embodiment, the control signal monitoring unit 31 monitors the control signal CS sent from the control MCU 11, and if the control signals CS are not received at a prescribed time interval, displays a video containing an OSD image, which is a message indicating that the control MCU 11 has abnormality, in the display 13.

According to the display device 200 of this embodiment, abnormality in the control MCU 11 can also be detected, in addition to abnormality in the input video IV resulting from a fault of the video generation unit 12 and the like, and an alert for the detection result can be issued.

The present invention is not limited to the embodiments described above. For example, in the embodiments described above, an example in which the meter video including a speedometer and a fuel gage is displayed was explained, but in addition to this, a configuration may be adopted in which a visual of car navigation is displayed in the display 13. The OSD image displayed as a warning display is not limited to a hydraulic pressure light, but a configuration may be adopted in which other warning lights such as a battery light and brake assist system are shown as a warning display.

In the embodiments described above, an image of a warning display was placed over a prescribed area of the meter video, but the prescribed area is not limited to one area, and may be a plurality of areas. That is, a configuration may be adopted in which a plurality of warning display images are displayed in a plurality of locations in one screen.

In the embodiments described above, an example was explained in which the compositing abnormality detection process is performed when the display request signal DR is supplied from the control MCU 11 to the OSD control unit 26. However, alternatively, a configuration may be adopted in which the control MCU 11 supplies a request signal that requests execution of the compositing abnormality detection process to the OSD control unit 26 at a prescribed time interval, and with this signal, the OSD generation unit 26 generates an OSD image, the compositing unit 23 generates a composite video CV, and the compositing abnormality detection unit 25 detects compositing abnormality periodically. With this configuration, it is possible to continuously ensure that the composite video CV is free from abnormality.

In addition, in the compositing abnormality detection process of the embodiments described above, an example was explained in which an OSD image is generated, and abnormality detection is performed using the CRC value on the composite video CV attained by combining the input video IV with the OSD image. However, it is also possible to perform abnormality detection using the CRC value on the OSD image that has yet to be combined with the input video IV.

In the embodiments described above, an example was explained in which the input video abnormality detection process was performed in accordance with the display request signal DR that requests a warning display. However, a configuration may be adopted in which the input video abnormality detection process is performed even if a warning display is not requested. For example, the control MCU 11 supplies a test signal to the video correction LSI 14 at a prescribed timing when a warning display is not requested. The video correction LSI compares the input video IV with the composite video CV in accordance with the test signal. With this configuration, it is possible to avoid a fault in which a warning display is erroneously shown when the warning display is not necessary.

What is claimed is:

1. A video processing device, comprising:
a receiver that successively receives, as input images, images successively generated, each input image of the input images having a prescribed superimposing image superimposed selectively in one or more areas of the input image based on external information;
a compositing image generation circuit that successively generates compositing images to be combined with the one or more areas of the input image based on the external information;
a video compositing circuit that successively generates composite images in which a compositing image is combined with the input image by replacing the one or more areas of the input image with the compositing image;
a compositing abnormality detection circuit that determines whether one or more areas of a composite image generated by the video compositing circuit have abnormality or not, the one or more areas of the composite image corresponding to the replaced areas of the input image;
a comparison circuit that compares the one or more areas of the input image with the one or more areas of the composite image to determine whether or not respective areas match, if it is determined that the one or more areas of the composite image do not have abnormality; and
an output control circuit that outputs the input image if it is determined that the one or more areas of the input image and the one or more areas of the composite image match, and outputs the composite image when it is determined that the respective areas do not match.

2. The video processing device according to claim 1, wherein, when the compositing abnormality detection circuit detects abnormality in the one or more areas of the composite image, the output control circuit outputs an image indicating that the composite image has abnormality.

3. The video processing device according to claim 1, wherein the compositing abnormality detection circuit determines whether or not the one or more areas of the composite image have abnormality by comparing a prescribed expected value with a value calculated from the compositing image using an error detection code.

4. The video processing device according to claim 1, wherein the comparison circuit compares an input image area of the superimposing image in the input image with a composite image area of the superimposing image in the composite image, and determines whether the input image area and the composite image area match each other or not.

5. The video processing device according to claim 1, wherein the video processing device is a device that performs video processing for a display device installed in a vehicle, and
wherein the prescribed superimposing image is an image representing a warning display for the vehicle.

6. A display device, comprising:
a video generation circuit that generates input images successively, the input images indicating a state that changes over time, and selectively superimposing a superposition image on one or more areas of each input image of the input images successively generated based on external information;
a receiver that successively receives the input images;
a compositing image generation circuit that successively generates compositing images to be combined with the one or more areas of the input image based on the external information;
an image compositing unit that successively generates composite images in which a compositing image is combined the input image by replacing the one or more areas of the input image with the compositing image;
a compositing abnormality detection circuit that determines whether one or more areas of a composite image generated by the image compositing unit have abnormality or not, the one or more areas of the composite image corresponding to the replaced areas of the input image;
a comparison circuit that compares the one or more areas of the input image with the one or more areas of the composite image to determine whether the respective areas match or not, if it is determined that the one or more areas of the composite image do not have abnormality;
an output control circuit that outputs the input image if it is determined that the one or more areas of the input image and the one or more areas of the composite image match, and outputs the composite image when it is determined that the respective areas do not match; and
a display unit that displays the input image or the composite image outputted from the output control circuit.

7. The display device according to claim 6, further comprising:
a control unit that generates a control signal and outputs the control signal at a prescribed time interval; and
a monitoring unit that monitors the control signal outputted at the prescribed time interval,
wherein, when the monitoring unit determines that the control signal is not outputted, the output control circuit outputs to the control unit an alert image that indicates the control unit has abnormality.

* * * * *